Jan. 12, 1954
E. J. HOUSEKEEPER ET AL
2,665,879
CONTROL VALVE FOR FIRE HOSE LINES
Filed Nov. 13, 1951
2 Sheets-Sheet 1
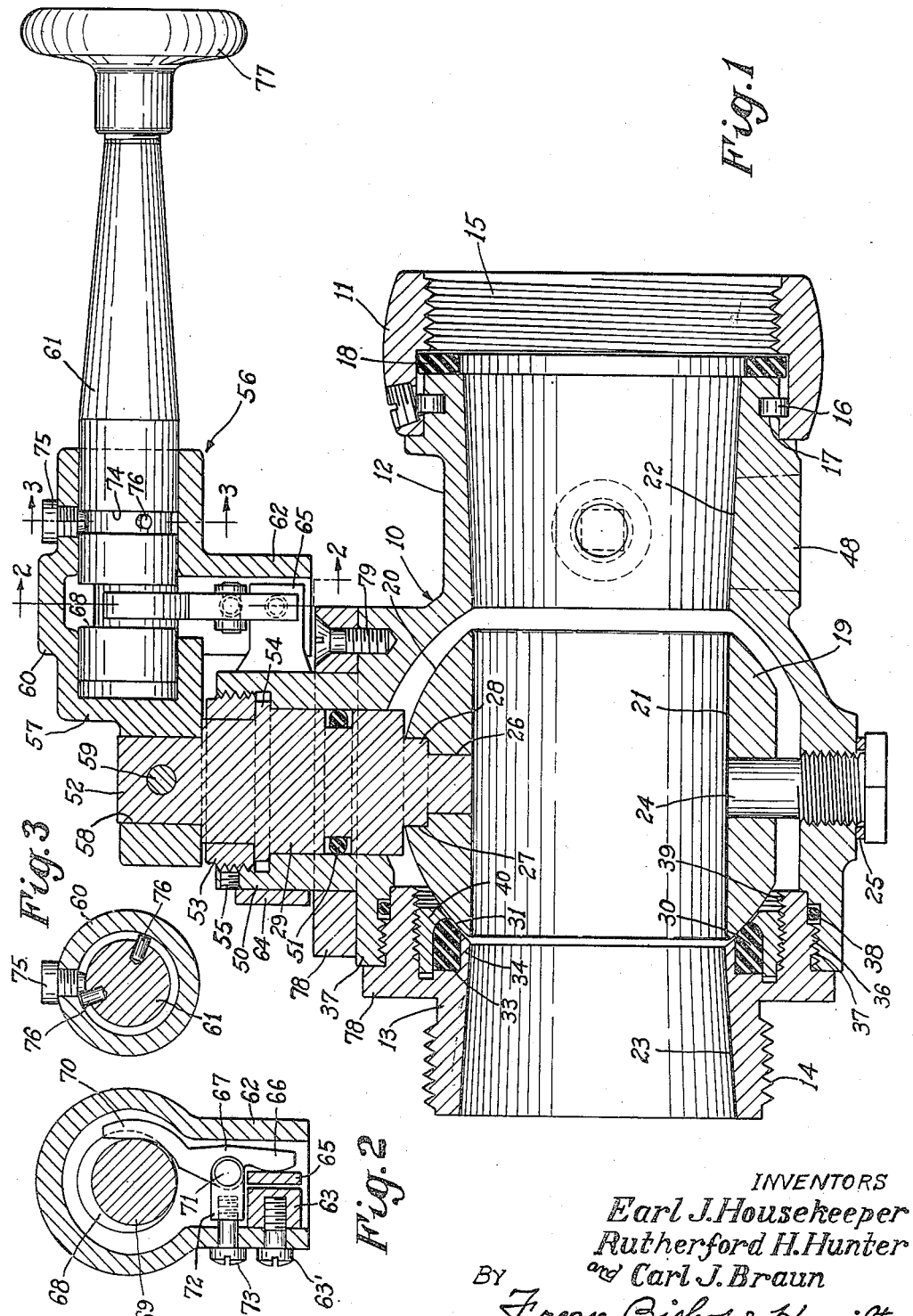
INVENTORS
Earl J. Housekeeper
Rutherford H. Hunter
and Carl J. Braun
BY Frease, Bishop & Hamilton
ATTORNEYS Jan. 12, 1954 E. J. HOUSEKEEPER ET AL 2,665,879
CONTROL VALVE FOR FIRE HOSE LINES
Filed Nov. 13, 1951 2 Sheets-Sheet 2

INVENTORS
Earl J. Housekeeper
Rutherford H. Hunter
By   Carl J. Braun
Frease, Bishop & Hamilton
ATTORNEYS Patented Jan. 12, 1954

2,665,879

UNITED STATES PATENT OFFICE 2,665,879

CONTROL VALVE FOR FIRE HOSE LINES

Earl J. Housekeeper, Rutherford H. Hunter, and Carl J. Braun, Wooster, Ohio, assignors, by mesne assignments, to The Fyr-Fyter Company, Dayton, Ohio, a corporation of Ohio Application November 13, 1951, Serial No. 256,095

5 Claims. (Cl. 251—163)

The invention relates generally to valves for regulating the flow of water in fire hose lines, and more particularly to a control valve adapted for controlling the flow in hose lines under widely varying by-pressures or vacuums.

Main control valves for regulating the flow through the pumping apparatus to the hose lines for fighting fires are usually of the quick-acting ball shut-off type and required to handle normal pressures of the order of 300–350 pounds per square inch, but under certain conditions as for example when using mist-producing nozzles for fighting oil fires and the like, centrifugal pumps having several stages of progressively higher pressures frequently are employed.

Prior control valves have included slow-acting gate valves and certain other types having metal-to-metal seats. Not only do such valves tend to leak under high pressures, but the higher the pressure the harder the valve is to operate.

Because main control valves regulate the flow through long lengths of hose at high pressures, it is necessary that the valve be opened gradually as the hose lines fill with water so that firemen can handle the hose without injury to themselves or damage to property, and it is highly desirable if not necessary that the valve can be locked at any position from fully closed to fully open to eliminate the necessity of manually holding the valve at such positions. Moreover, locking the valve in various positions enables the pump operator to furnish different pressures to the hose lines without changing the engine or pump speed.

It is an object of the present invention to provide a novel and improved ball shut-off control valve for fire hose lines which maintains a tight seal under extremely high pressures and vacuums.

Another object is to provide novel locking means for locking the valve at any desired position from fully closed to fully open position.

These and other objects are accomplished by the parts, improvements, constructions and combinations comprising the present invention, a preferred embodiment of which is shown in the accompanying drawings as exemplifying the best known mode of carrying out the invention, said invention being described in detail in the accompanying specification and defined in the appended claims.

In general terms, the invention may be set forth as including in a rotatable ball shut-off valve rotatable through 90° from fully closed to fully open position, a ball shut-off having a through port for registering with entrance and exit ports on opposite sides thereof, and a handle attached to a valve stem operatively connected to the ball having means for clamping the housing portion in which the valve stem is journaled, the handle being axially rotatable to tighten or loosen said clamping means.

Referring to the drawings in which a preferred embodiment of the invention is illustrated by way of example:

Figure 1 is a longitudinal cross sectional view of the novel control valve, showing the ball shut-off in fully open position;

Fig. 2 is a transverse sectional view taken on line 2—2, Fig. 1;

Fig. 3 is a transverse sectional view taken on line 3—3, Fig. 1;

Similar numerals refer to similar parts throughout the drawings.

Figure 4:
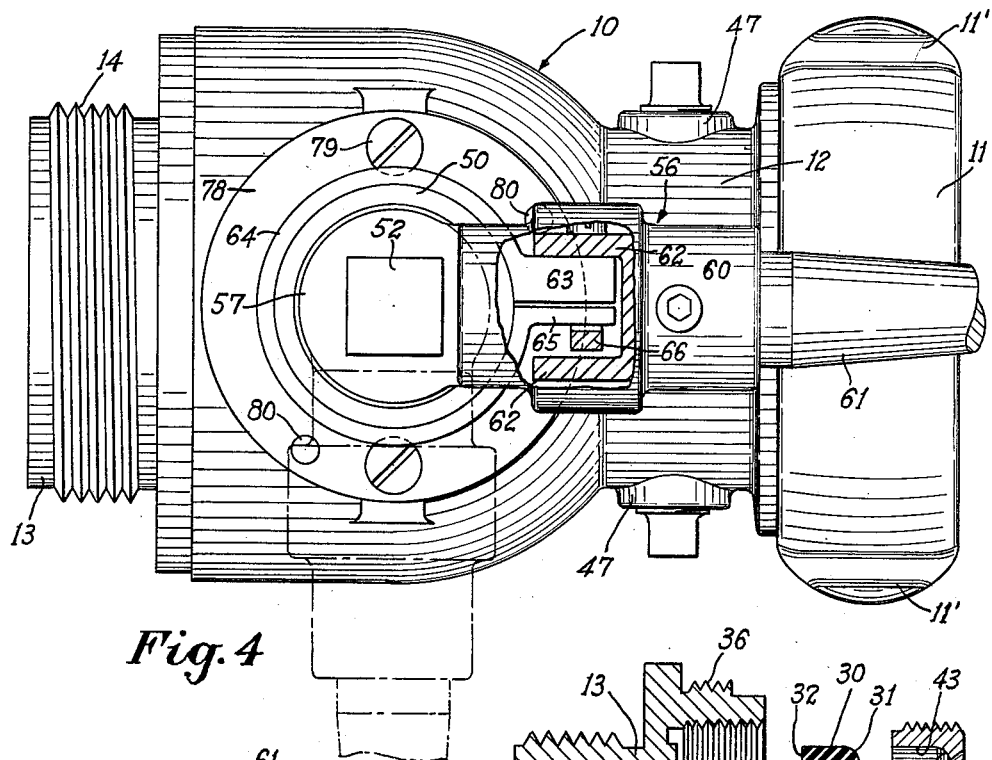
Fig. 4 is a plan elevation of the valve shown in Fig. 1, part of the handle being broken away, and the fully closed position of the handle being shown in dot-dash lines.
Figure 5:
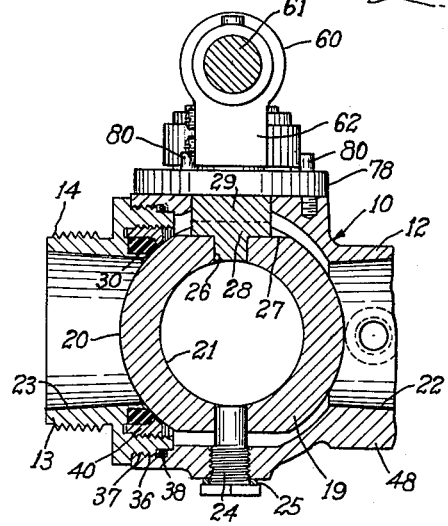
Fig. 5 is a fragmentary sectional view similar to Fig. 1, with the ball shut-off in fully closed position, and parts of the valve housing and handle in elevation.

The control valve shown in the drawings and described herein is provided with a swiveling female inlet at one end and a threaded male outlet at the other end, but it will be understood that the types of inlet and outlet connections may be changed to suit various conditions without departing from the scope of the invention. For example, the valve may have a flanged inlet and a threaded male outlet, or a rigid female inlet and a rigid female outlet. Other combinations of inlet and outlet connections will be apparent, and all such combinations are intended to be included in the present invention.

In the embodiment shown in the drawings the valve housing indicated generally at 10 has a female swivel 11 having spanner wrench lugs 11' and mounted on the inlet neck 12, and the outlet neck 13 is provided with male threads 14 for screwing into the female end of a conventional hose coupling. The swivel 11 has internal threads 15 adapted to screw onto the male end of a conventional hose coupling. The swivel may be journaled on the neck 12 by means of a plurality of rollers 16 rolling in a raceway 17 in the housing neck, and a rubber gasket 18 is provided in the swivel for making a water-tight connection with the male end of the hose coupling.

The ball shut-off 19 is positioned between the necks 12 and 13, and has a spherical outer surface 20 and a cylindrical through passageway 21 which registers with the inlet passageway 22 and the outlet passageway 23 when the ball shut-off is in fully open position. The ball shut-off may be rotatably mounted at one side on a screw stud 24 which projects inwardly through the bottom of housing 10, there being a sealing gasket 25 provided between the head of the screw stud and the housing. The opposite side of the ball shut-off is provided with a hole 26 aligned with the stud 24 and the outer end of the hole communicates with a keyway 27 into which is fitted the key portion 28 of the valve stem 29, so that rotation of the valve stem will rotate the ball shut-off.

The parts thus far described per se form no part of the present invention, excepting as they may enter into the combinations set forth in the claims.

Figure 6:
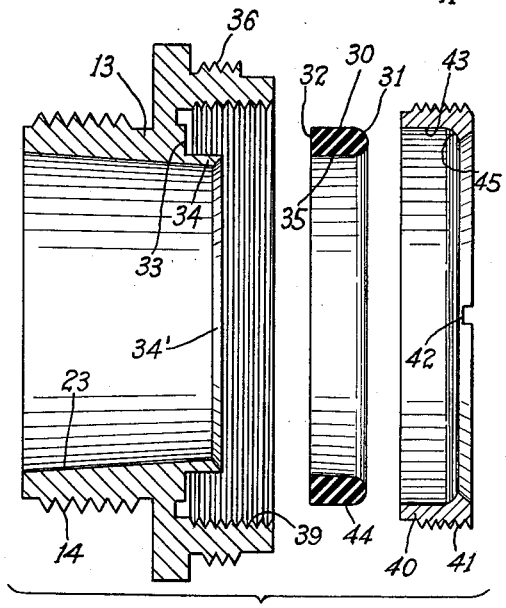
Fig. 6 is an expanded sectional view of the novel sealing ring and elements for clamping the same in the housing.

As best shown in Figs. 1 and 6, a resilient sealing ring 30 is provided having a solid or closed U-shape in cross section with one edge rounded and the other edge rectangular. The ring is made of a material which is resilient and also has high resistance to wear and abrasion, and may be a synthetic rubber composition or the like. The rounded edge portion 31 is resiliently and slidably held in engagement with the spherical surface 20 of the ball, and the ring is of such diameter as to surround the cylindrical opening 21 in the ball in open position. As shown, the rectangular edge portion 32 of the ring is seated on an annular shoulder 33 formed in the neck 13 and having an annular flange portion 34 for abutting the inner annular surface 35 of the sealing ring. The edge of the flange 34 is preferably beveled as shown at 34' to clear the spherical surface 20 of the ball.

The outlet neck 13 is preferably provided with external screw threads 36 on its inner end for screwing into an internally threaded portion 37 on the housing, so as to make the neck 13 easily detachable. An O ring 38 is provided between the housing and the inner end of the neck to make a watertight seal. The inner end of the neck 13 is also provided with internal screw threads 39 radially outward of the annular shoulder 33, and a clamping ring 40 is provided with external threads 41 for screwing into the threads 39. The edge of the clamping ring 40 may be provided with one or more wrench slots 42 for aiding in screwing the ring tightly into the neck 13. The inner annular surface 43 of the clamping ring is adapted to abut tightly against the outer annular surface 44 of the sealing ring 30 when the clamping ring is screwed tightly into the threads 39 of the neck 13. The inner annular surface 43 of the clamping ring terminates in an inwardly curved portion 45 which is adapted to fit around and clamp over a portion of the rounded surface 31 of the sealing ring, as shown in Fig. 1.

Thus, when the clamping ring 40 is screwed tightly into the threads 39 of the neck 13 the rectangular edge portion and a portion of the rounded edge portion of the resilient sealing ring 30 is tightly clamped in such manner that it cannot blow out under pressure or vacuum but the unclamped rounded portion of the ring 30 is able to flex while slidably engaging the spherical surface 20 of the ball shut-off so as to provide an annular sealing surface therewith of substantial width. Accordingly, the amount of sealing surface presented by the ring compensates for irregularities in the spherical surface of the ball and also provides a tight seal even though particles of foreign matter may get in between the sealing surfaces.

As indicated at 47 and 48 bosses may be provided in the housing for connecting pressure take-off lines to gauges and hose line drains or vents. Similar bosses may be provided in the outlet neck by extending the neck behind the threads 14.

Referring to the valve stem and operating handle construction, the valve housing 10 is provided between the inlet and outlet necks with an angularly disposed tubular sleeve 50 in which the valve stem 29 is journaled, and an O ring 51 preferably is provided between the sleeve and stem for making a water tight seal. The outer end of the stem has a square wrench receiving portion 52 and a threaded bushing 53 is screwed into the outer end of the sleeve 50 and abuts a shoulder 54 on the valve stem for forcing the valve stem inwardly and holding the keyway portion 28 thereon in operative connection with the ball 19. A set screw 55 may be provided in the housing sleeve 50 for holding the bushing 53 against rotation.

The handle indicated generally at 56 preferably includes a wrench portion 57 having a square opening 58 fitting over the square portion 52 of the valve stem. A pin 59 may be inserted through the wrench portion 57 and square portion 52 for securing the handle on the valve stem. The wrench portion 57 preferably has a tubular portion 60 connected thereto and a cylindrical handle portion 61 is journaled therein for axial rotation.

A flange portion 62 depends from the sleeve portion 60 and the angular end 63 of a split ring collar 64 is secured therein by a screw 63'. The ring 64 fits around the housing sleeve 50 and the other angular end 65 of the split ring is normally spaced from the end 63 as shown in Figs. 2 and 4, and the end 65 is arranged to be forced against the end 63 by one end 66 of a lever 67. When the ends 63 and 65 of the split ring 64 are spaced apart as shown, the ring 64 will slip or rotate on the housing sleeve 50, and when the end 65 of the ring is forced against the end 63, the ring is tightly clamped on the housing sleeve 50 so as to lock the handle 56 against turning.

The means for operating the lever 67 preferably consists of a groove 68 in the handle portion 61 forming an eccentric cam portion 69 rotatably engaging the upper end 70 of the lever. Thus, rotation of the handle portion 61 through 90° will actuate the lever to open and close the ends of the split ring. The lever 67 is pivoted at 71 on a block 72 which is adjustably mounted in the flange portion 62 by a screw 73. Preferably the handle portion 61 is provided with a second groove 74 which is engaged by the end of a set screw 75, and pins 76 are positioned 90° apart in the groove to limit the axial rotation of the handle portion. As shown, the outer end of the end portion 61 may be provided with a hand grip 77.

A guide ring 78 fits around the base of the housing sleeve portion 50 and preferably is secured to the housing by screws 79. Stop pins 80 may be mounted on the ring 78 for engaging the flange portion 62 of the handle and limiting the rotation of the handle to 90°.

In the operation of the novel control valve, the operator can, by turning the handle 61 through 90°, lock the handle to the housing sleeve 50 and thus lock the ball valve at any desired position between fully closed and fully open position. The valve thus has the advantage of quick and easy operation by the rotating handle plus the ability to quickly lock the handle in any position and leave it in that position as long as desired. Thus when hose lines connected to the valve are laid out and ready to be filled with water, the operator can open the valve very slightly and lock it in that position while he helps with the hose or performs other duties. The valve can be opened a little at a time and locked in each intermediate position until the hose is filled and under full pressure without the hazard of injury to the men laying out the hose lines or damage to property, as is present when the control valve is opened wide suddenly. Also, different pressures can be supplied to the hose lines without changing the pump speed, merely by locking the valve at different positions.

The novel control valve of the present invention has the advantages of quick and easy operation and water-tight sealing under high pressures and vacuums without any danger of the sealing gaskets blowing out, and is simple and inexpensive in construction while providing for easy inspection and repair or replacement of parts.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use of a preferred embodiment thereof, and the advantageous new and useful results obtained thereby; the new and useful constructions, and reasonable mechanical equivalents thereof obvious to those skilled in the art, are set forth in the appended claims.

We claim:

1. In a control valve having a housing and a tubular ball shut-off rotatably mounted between inlet and outlet ports in said housing, a sleeve portion projecting from one side of said housing, a valve stem journaled in said sleeve portion and operatively connected to said ball, a handle connected to said valve stem for rotating said ball shut-off, a split ring secured to said handle and fitting around said sleeve portion, said handle having an axially rotatable portion, and lever means operated by rotation of said handle portion for clamping said split ring on said sleeve portion at any position of said ball shut-off.

2. In a control valve having a housing and a tubular ball shut-off rotatably mounted between inlet and outlet ports in said housing, a sleeve portion projecting from one side of said housing, a valve stem journaled in said sleeve portion and operatively connected to said ball, a handle connected to said valve stem for rotating said ball shut-off, a split ring secured to said handle and fitting around said sleeve portion, said handle having an axially rotatable eccentric cam portion, and a lever mounted on said handle operatively engaged by said cam portion for clamping said split ring on said sleeve portion at any position of said ball shut-off.

3. In a control valve having a housing and a tubular ball shut-off rotatably mounted between inlet and outlet ports in said housing, a sleeve portion projecting from one side of said housing, a valve stem journaled in said sleeve portion, and operatively connected to said ball shut-off, a handle having a wrench portion detachably connected to said valve stem, a split ring mounted on said wrench portion and fitting around said angular sleeve portion, said handle having an axially rotatable cam portion journaled in said wrench portion, and a lever pivoted in said wrench portion and operatively engaged by said cam portion for clamping said split ring on said angular sleeve portion in any position of said handle.

4. In a control valve having a rotary valve element journaled in a housing sleeve and a handle bar provided with a laterally extending wrench portion detachably connected to said valve element, said handle bar journaled in said laterally extending wrench portion, a split ring secured to said wrench portion and fitting around the sleeve, a lever pivoted on said wrench portion for clamping said split ring on said sleeve, and means operated by rotation of said handle bar on its own axis to actuate said lever.

5. In a control valve having a rotary valve element journaled in a housing sleeve and a handle provided with a wrench portion detachably connected to said valve element, said handle bar journaled in said laterally extending wrench portion, a split ring secured to said wrench portion and fitting around the sleeve, a lever pivoted on said wrench portion for clamping said split ring on said sleeve, and a cam on said handle bar for actuating the lever when the handle bar is rotated on its own axis.

EARL J. HOUSEKEEPER.
RUTHERFORD H. HUNTER.
CARL J. BRAUN.

References Cited in the file of this patent

UNITED STATES PATENTS

| Number | Name | Date |
|---|---|---|
| 115,904 | Stewart | June 12, 1871 |
| 1,395,678 | Jones | Nov. 1, 1921 |
| 1,435,403 | Lindsay | Nov. 14, 1922 |
| 1,451,944 | Dooner | Apr. 17, 1923 |
| 1,743,685 | Platt | Jan. 14, 1930 |
| 1,973,418 | Sibley | Sept. 11, 1934 |
| 2,006,791 | Corley | July 2, 1935 |
| 2,167,171 | Dodge | July 25, 1939 |
| 2,191,232 | Heinen | Feb. 20, 1940 |
| 2,251,560 | White | Aug. 5, 1941 |
| 2,346,892 | Aldrich | Apr. 18, 1944 |
| 2,558,260 | Maky | June 26, 1951 |